(12) United States Patent
Muraki et al.

(10) Patent No.: US 8,130,470 B2
(45) Date of Patent: Mar. 6, 2012

(54) SUSPENSION ASSEMBLY INCLUDING A LIMITER HAVING A GROSS LENGTH LARGER THAN A BETWEEN-COUPLING-PORTIONS DISTANCE BETWEEN COUPLING PORTIONS

(75) Inventors: Takuma Muraki, Kanagawa (JP); Hiroyasu Tsuchida, Kanagawa (JP); Tomoki Hiramatsu, Kanagawa (JP); Takeji Sumiya, Kanagawa (JP)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 993 days.

(21) Appl. No.: 11/998,624

(22) Filed: Nov. 29, 2007

(65) Prior Publication Data

US 2008/0144223 A1 Jun. 19, 2008

(30) Foreign Application Priority Data

Dec. 14, 2006 (JP) ................................. 2006-336467

(51) Int. Cl.
  *G11B 5/48* (2006.01)
(52) U.S. Cl. .................. 360/245.3; 360/245.7
(58) Field of Classification Search .............. 360/245.7, 360/245.3, 245.4
  See application file for complete search history.

(56) References Cited

U.S. PATENT DOCUMENTS

| | | | | |
|---|---|---|---|---|
| 4,141,050 A | * | 2/1979 | Wiseley | 360/245.3 |
| 5,473,487 A | * | 12/1995 | Nagase | 360/245.6 |
| 5,530,606 A | * | 6/1996 | Baasch et al. | 360/245.6 |
| 5,768,062 A | * | 6/1998 | Anderson et al. | 360/245.9 |
| 5,959,807 A | | 9/1999 | Jurgenson | |
| 6,028,740 A | * | 2/2000 | Konno et al. | 360/245.7 |
| 6,195,227 B1 | * | 2/2001 | Fan et al. | 360/294.3 |
| 6,249,404 B1 | * | 6/2001 | Doundakov et al. | 360/245.4 |
| 6,266,212 B1 | * | 7/2001 | Coon | 360/234.5 |
| 6,462,911 B1 | * | 10/2002 | Tokuyama et al. | 360/245.7 |
| 6,587,309 B2 | * | 7/2003 | Nojima | 360/245.7 |
| 6,801,400 B2 | * | 10/2004 | Fu et al. | 360/245.7 |
| 7,006,333 B1 | * | 2/2006 | Summers | 360/294.4 |
| 7,283,332 B2 | * | 10/2007 | Weber | 360/245.5 |
| 7,386,932 B2 | * | 6/2008 | Girard | 29/603.06 |
| 7,535,678 B2 | * | 5/2009 | Arya | 360/245.7 |
| 7,583,474 B2 | * | 9/2009 | Suzuki et al. | 360/245.7 |
| 7,839,604 B1 | * | 11/2010 | Coffey et al. | 360/265.9 |
| 8,027,128 B2 | * | 9/2011 | Muraki et al. | 360/245.3 |
| 2006/0034017 A1 | | 2/2006 | Agari et al. | |
| 2006/0132979 A1 | | 6/2006 | Horie et al. | |
| 2007/0230058 A1 | * | 10/2007 | Muraki et al. | 360/245.7 |

FOREIGN PATENT DOCUMENTS

JP   11-272451   10/1999
JP   2007-234829   9/2007

* cited by examiner

*Primary Examiner* — Brian Miller

(57) ABSTRACT

Embodiments of the present invention provide a suspension assembly having a dielectric limiter. According to one embodiment, the suspension assembly includes a load beam and a flexure assembly. The flexure assembly includes a metal layer where there are formed a fixing portion fixed to the load beam, main rings, and extending from the fixing portion, sub-rings, and a flexure tongue having moving-side limiter coupling portions defined thereon. Fixing-side limiter coupling portions are defined at the main rings. Dielectric limiters each have a gross length larger than a between-coupling-portions distance between a fixing-side limiter coupling portion and a moving-side limiter coupling portion, and couple the fixing-side limiter coupling portion to the moving-side limiter coupling portion.

19 Claims, 6 Drawing Sheets

SUSPENSION ASSEMBLY INCLUDING A LIMITER HAVING A GROSS LENGTH LARGER THAN A BETWEEN-COUPLING-PORTIONS DISTANCE BETWEEN COUPLING PORTIONS

CROSS-REFERENCES TO RELATED APPLICATIONS

The instant nonprovisional patent application claims priority to Japanese Patent Application No. 2006-336467 filed Dec. 14, 2006 and which is incorporated by reference in its entirety herein for all purposes.

BACKGROUND OF THE INVENTION

In a magnetic disk drive, a head/slider flies at a very slight height (flying height) over a rotating magnetic disk. The head/slider is mounted to a suspension assembly and supported over the magnetic disk. The suspension assembly includes a load beam and a flexure assembly, and the flexure assembly includes a flexure tongue. The head/slider is mounted to the flexure tongue.

The suspension assembly is mounted to an actuator unit and moves rotationally over the magnetic disk. A structure in which the head/slider is mounted to the suspension assembly is called a head gimbal assembly (HGA). A magnetic head formed on the head/slider needs to be accurately positioned over a track during read/write operation. An error can occur when the head/slider is positioned over the track due to various manufacturing errors occurring in different components making up the magnetic disk drive or irregularity in behavior of an air bearing or the suspension assembly.

Accordingly, the flexure tongue performs, with respect to the magnetic disk, a flexible pivotal motion generally known as a pitch and roll motion or a gimbal motion, thereby compensating for the error. In order for the flexure assembly to properly perform this delicate pivotal motion, the spring constant thereof is set with accuracy and managed.

The HGA incorporated in the magnetic disk drive is retracted in the ramp mechanism while the magnetic disk stops its rotation. The magnetic disk drive needs to tolerate a larger external impact force during the retracted state (non-operating state) than during the operating state. When an acceleration is applied to the head/slider of the HGA by an impact force, the flexure assembly supporting the head/slider is displaced largely due to the mass of the head/slider. When the displacement exceeds a certain level, the flexure assembly is plastic-deformed and cannot perform a given pivotal motion. Therefore, the suspension assembly is usually provided with a mechanism, called a limiter, for limiting the displacement of the flexure tongue. The plastic deformation of the suspension assembly may occur not only due to an impact on the magnetic disk during non-operation but also due to the handling of the HGA in a manufacturing process.

Japanese Patent Publication No. 2006-53971 ("Patent Document 1") discloses a limiter, formed on a flexure, which engages in a load beam when a flexure tongue is displaced. Disadvantageously, the limiter of such a structure requires the bending work of the flexure, which increases costs, and a space for the limiter is needed, which is not appropriate for miniaturization. Japanese Patent Publication No. 1998-69745 ("Patent Document 2") discloses a technique for limiting the motion range of a flexure tongue by a tether portion which is a part of an insulating layer, in place of a mechanical impact motion limiter such as that disclosed in Patent Document 1. The flexure tongue is coupled to a flexure base by the tether portion formed linearly.

According to the technique described in Patent Document 2, since the linear tether portion couples the flexure tongue to the flexure base, it can be considered that upon slight displacement of the flexure tongue with respect to the flexure base, the tether portion suppresses the motion instantly. If the tether portion of such a structure is adopted as a limiter, it may affect the normal pivotal motion of the flexure tongue. The smaller the suspension assembly, the more affected the pivotal motion is.

BRIEF SUMMARY OF THE INVENTION

Embodiments in accordance with the present invention provide a suspension assembly having a dielectric limiter. According to the particular embodiment shown in FIG. 3, the suspension assembly includes a load beam and a flexure assembly 100. The flexure assembly includes a metal layer where there are formed a fixing portion 119$b$ fixed to the load beam, main rings 113$a$, 113$b$, 115$a$, and 115$b$ extending from the fixing portion, sub-rings 111$a$ and 111$b$, and a flexure tongue 123 having moving-side limiter coupling portions 127$a$ and 127$b$ defined thereon. Fixing-side limiter coupling portions 129$a$ and 129$b$ are defined at the main rings. Dielectric limiters each have a gross length larger than a between-coupling-portions distance between a fixing-side limiter coupling portion and a moving-side limiter coupling portion, and couple the fixing-side limiter coupling portion to the moving-side limiter coupling portion.

DETAILED DESCRIPTION OF THE INVENTION

Figure 1:
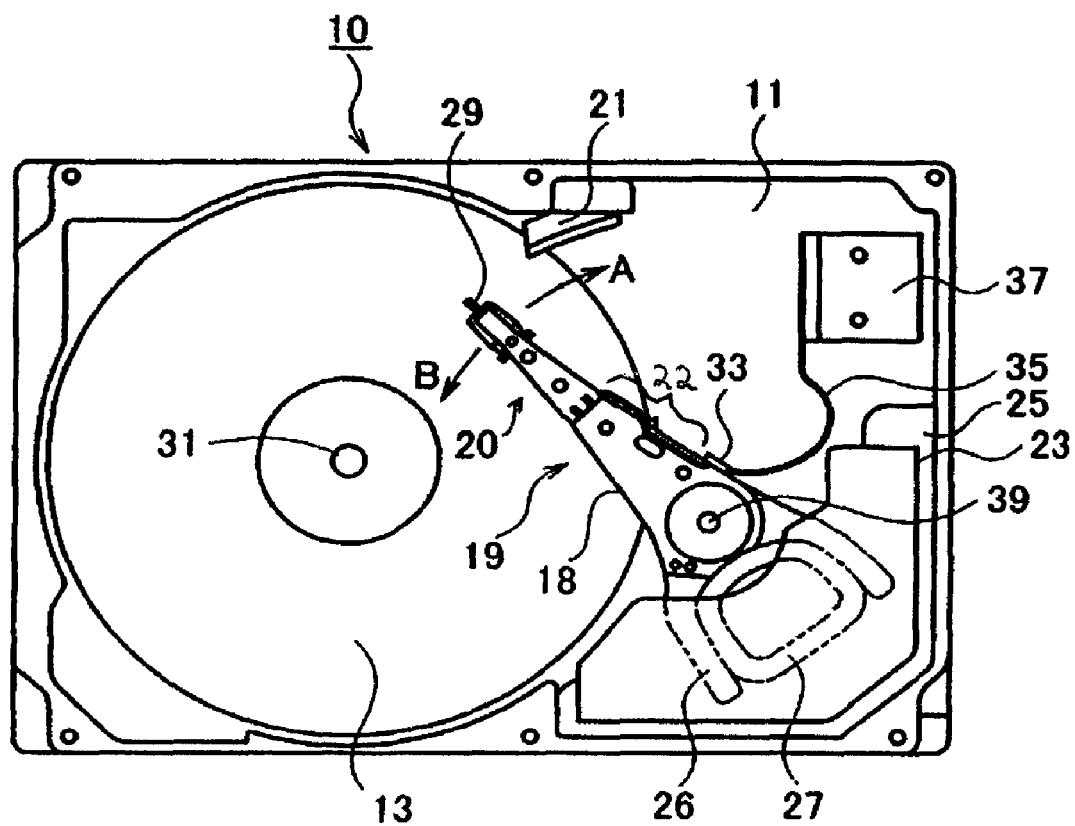
FIG. 1 is a plan view of a magnetic disk drive.

Embodiments of the present invention relate to a limiter structure of a suspension assembly adopted in a magnetic disk drive, and more particularly, to a limiter structure suitable for making a suspension assembly smaller.

It is an object of embodiments of the present invention to provide a suspension assembly having a dielectric limiter that does not affect a pivotal motion and is suitable for miniaturization. Another object of embodiments of the invention is to provide a suspension assembly having a dielectric limiter that can be formed without mechanical work. Still another object of embodiments of the invention is to provide a suspension assembly having a dielectric limiter that can be formed in a manufacturing process of an insulating layer of the suspension assembly. A further object of embodiments of the invention is to provide a magnetic disk drive adopting such a suspension assembly.

According to an aspect of one embodiment of the invention, a suspension assembly includes a load beam and a flexure assembly, and the flexure assembly includes a metal layer and an insulating layer. The metal layer provides the function of determining the motion performance of the flexure assembly, and is composed of a fixing portion fixed to the load beam, an arm portion extending from the fixing portion, and a flexure tongue having a moving-side limiter coupling portion defined thereon and supported by the arm portion. The insulating layer includes a wiring lower layer portion.

The suspension assembly equipped with a head/slider is incorporated into a magnetic disk drive. The gross length of a dielectric limiter is larger than a between-coupling-portions distance while the head/slider performs a pivotal motion. Therefore, the dielectric limiter does not exert tension, so that the head/slider can perform a pivotal motion without being affected by the dielectric limiter.

When an external impact is applied to the magnetic disk during non-operation, a force that occurs by an acceleration applied to the head/slider displaces the flexure assembly. Then, a distance between both coupling portions becomes larger than the between-coupling-portions distance, so that the dielectric limiter begins to exert tension, thus preventing flexure assembly from being further displaced. The moving-side limiter coupling portion can be provided on the wiring lower layer portion of the insulating layer.

Embodiments of the present invention can provide a suspension assembly having a dielectric limiter that does not affect a pivotal motion and is suitable for miniaturization. Further, embodiments of the invention can provide a suspension assembly having a dielectric limiter that can be formed without mechanical work. Furthermore, embodiments of the invention can provide a suspension assembly having a dielectric limiter that can be formed in a manufacturing process of an insulating layer of the suspension assembly. Moreover, embodiments of the invention can provide a magnetic disk drive adopting such a suspension assembly.

Structure of Entire Magnetic Disk Drive

FIG. 1 is a plan view of a magnetic disk drive 10 according to an embodiment of the present invention. There are mounted on a base 11 a magnetic disk 13, a head supporting mechanism 19, a ramp mechanism 21, a voice coil magnet 25, a voice coil yoke 23, and the like. The magnetic disk 13 is a magnetic recording medium having recording layers formed on the front side and the back side thereof. The magnetic disk 13 is fixed to the hub of a spindle motor provided below and is rotatable about a spindle shaft 31.

The head supporting mechanism 19 is composed of a head gimbal assembly (HGA) 20 and an actuator unit 18. In the actuator unit 18, there are provided at a distal end an actuator arm 22 to which the HGA 20 is fixed, at a central portion a pivot heading in which a pivot cartridge 39 is inserted, and at a rear end a voice coil 27. The voice coil 27 is held by a coil support 26. The HGA 20 is composed of a head/slider (not shown) and a suspension assembly shown in FIG. 2.

There is formed a magnetic flux space between the voice coil magnet 25 and the voice coil yoke 23. The voice coil 27, the voice coil magnet 25, and the voice coil yoke 23 constitute a voice coil motor (VCM) for driving the actuator unit 18.

When direct current flows through the voice coil 27 placed in the magnetic flux space, the head supporting mechanism 19 moves rotationally in the direction of arrow A or B about a pivot shaft. In the magnetic disk drive 10, when the head supporting mechanism 19 rotates in the direction of arrow A, a lift tab 29 formed at a distal end of the HGA 20 slides along the slide surface of the ramp mechanism 21 and stops at a home position. This operation is referred to as unloading. At the time of stopping the rotation of the magnetic disk 13 based on an external command or an internal event, unloading is performed before the magnetic disk 13 stops rotating.

On the other hand, an operation for moving the head supporting mechanism 19 placed at the home position from the ramp mechanism 21 in the direction of arrow B and causing the head supporting mechanism 19 to fly over the rotating magnetic disk 13 is referred to as loading. Loading is performed before a magnetic head starts to access the magnetic disk 13. A head amplifier 33 is mounted to the head supporting mechanism 19. The head amplifier 33 is connected to the head/slider and a flexible cable 35. The flexible cable 35 is connected through an external terminal 37 to a circuit board (not shown) mounted outside the base 11.

Figure 2A:
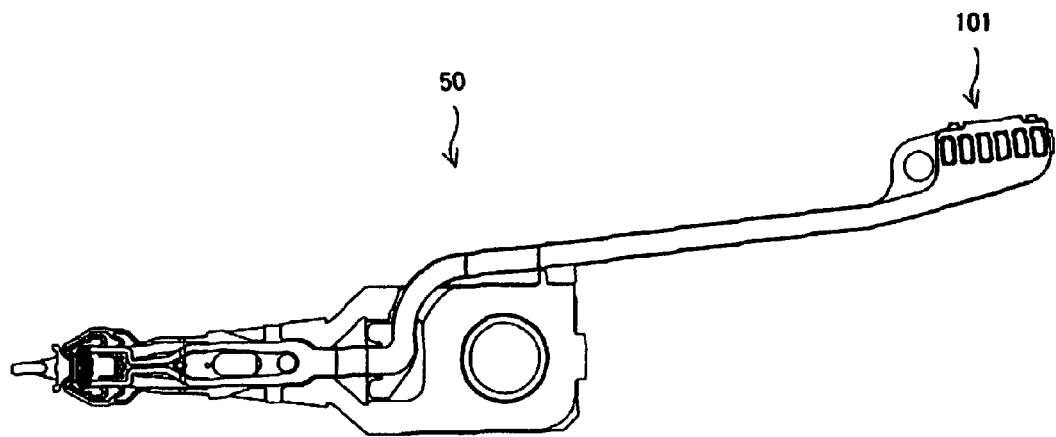
FIGS. 2(A) and 2(B) are plan views of a suspension assembly.
Figure 2B:
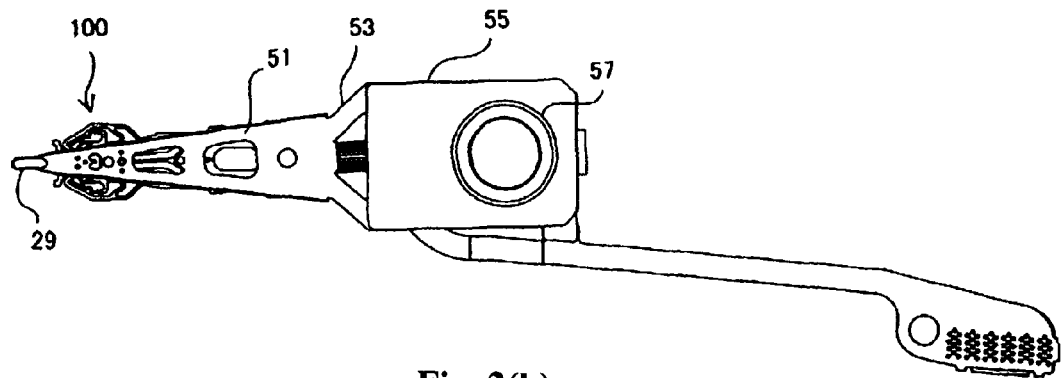

FIG. 2 is a plan view of a suspension assembly constituting the HGA 20. FIG. 2(A) is a plan view as viewed from the magnetic disk 13. FIG. 2(B) is a plan view as viewed from the same direction as in FIG. 1. The suspension assembly 50 is a structure obtained by removing a head/slider from the HGA 20. The suspension assembly 50 mainly comprises a load beam 51, a hinge 53, a mount plate 55, and a flexure assembly 100, and is called a multi-piece type. However, the structure of the flexure assembly according to embodiments of the invention is not limited thereto.

A swage spud 57 is formed on the mount plate 55. The mount plate 55 is fixed to the actuator arm of the actuator unit 18 by swaging. The hinge 53 for coupling the load beam 51 to the mount plate 55 applies to the load beam 51 a pressing load (gram load) onto a surface of the magnetic disk 13. The flexure assembly 100 is spot-welded to the load beam 51 and the mount plate 55 at a plurality of weld spots. A terminal 101 is formed at an end portion of the flexure assembly 100, and connected to the flexible cable 35.

FIG. 3 is a plan view showing the structure of the distal end portion of the flexure assembly 100. FIG. 4 is an enlarged view of the distal end portion shown in FIG. 3(A). The flexure assembly 100 is formed as a laminated structure using micro-machining techniques including a photolithographic etching process, a deposition process, and the like. FIG. 3(A) shows the flexure assembly 100 completed by laminating a plurality of layers one on top of another. FIGS. 3(B) through 3(E) show, respectively, structures of the plurality of layers making up the flexure assembly 100. FIG. 3(A) illustrates the completed flexure assembly as viewed from the magnetic disk 13. FIGS. 3(B) through 3(E) show different layers laminated in order of laminating toward the surface of the magnetic disk 13.

Figure 3A:
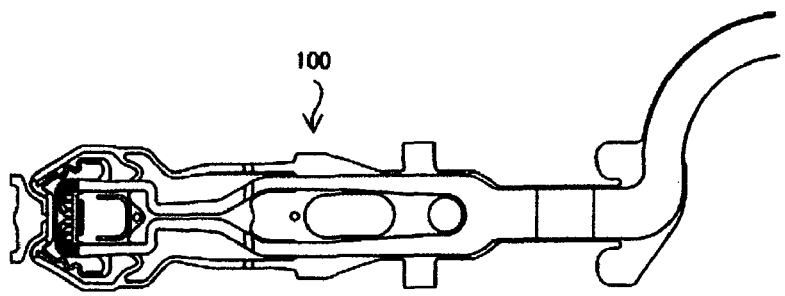
FIGS. 3(A)-3(E) are illustrations showing the structure of a flexure assembly.
Figure 3B:
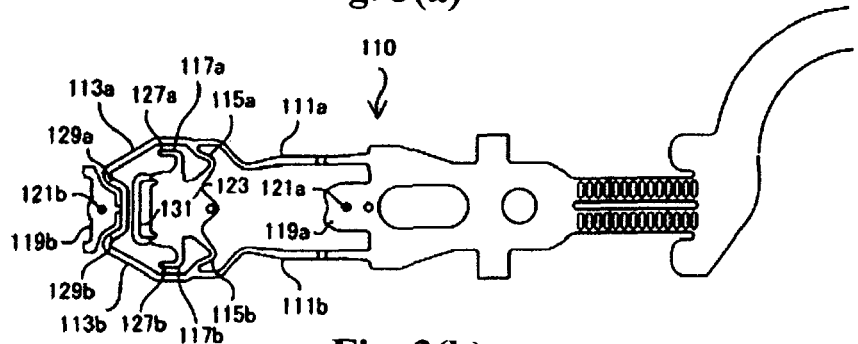
Figure 4:
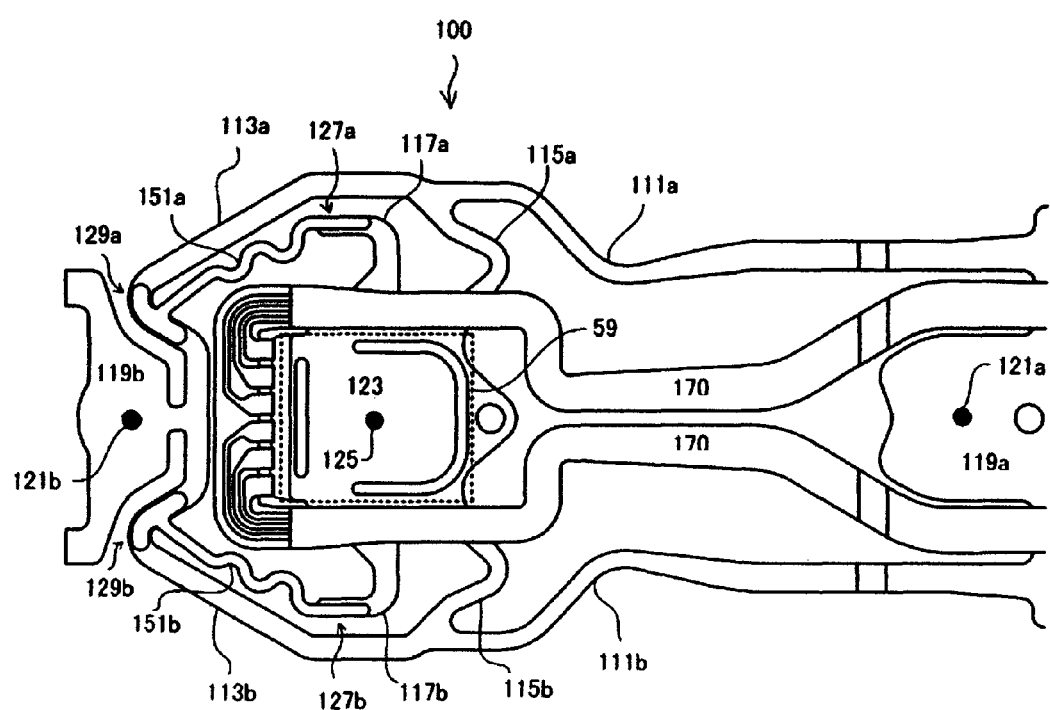
FIG. 4 is an enlarged view of a distal end of the flexure assembly.

FIG. 3(B) is a plan view showing a metal layer 110. Stainless steel in the 300 series is adopted as the material thereof. The metal layer 110 is stamped into a desired shape. Stainless steel is not the only possible material for the metal layer 110. Rather, it may be possible to select another hard spring material, such as beryllium, copper, titanium, or the like. In this specification, the lift tab 29 side of the HGA 20 is referred to as a distal end side, while the mount plate 55 side is referred to as a base end side.

As shown in FIG. 4 in detail, the metal layer 110 is provided with a fixing portion 119a on the base end side and a fixing portion 119b on the distal end side. Weld spots 121a and 121b are defined in the fixing portions 119a and 119b respectively. The fixing portions 119a and 119b are spot-welded to the load beam 51 at the weld spots 121a and 121b respectively to be integral with the load beam. The flexure assembly 100 is not fixed to the load beam between the weld spots 121a and 121b. This frees the flexure assembly 100 from a restraint of the load beam 51 over the range described in the foregoing, allowing the flexure assembly 100 to perform a pivotal motion. The distal end portion of the metal layer 110 is constructed symmetrically with respect to the longitudinal axis (a line passing through the weld spots 121*a* and 121*b*) of the load beam 51.

Sub-rings 111*a* and 111*b* which are a pair of strip-shaped arms extend from the fixing portion 119*a* toward the distal end side, and main rings 113*a* and 113*b* which are a pair of strip-shaped arms extend from the fixing portion 119*b* toward the base end side. A main ring 115*a* extends from the portion where the sub-ring 111*a* meets the main ring 113*a*, and a main ring 115*b* extends from the portion where the sub-ring 111*b* meets the main ring 113*b*. The main rings 113*a*, 115*a*, 113*b*, and 115*b* and the sub-rings 111*a* and 111*b* couples the fixing portions 119*a* and 119*b* to a flexure tongue 123 so that the flexure tongue 123 can perform a pivotal motion.

The flexure tongue 123 is coupled to the main rings 115*a* and 115*b*. Since the flexure tongue 123 and the surrounding main and sub rings do not require a mechanical limiter, they are formed substantially in a flat shape. A head/slider 59 indicated by the dotted lines is mounted to the flexure tongue 123, thus constituting the HGA 20. The magnetic head side of the head/slider 59 is called an air outflow end (a trailing edge), while the opposite side is called an air inflow end (a leading edge). In this embodiment, the magnetic head is formed at the distal end side of the head/slider 59. The distal end side of the flexure tongue 123 along the direction of mounting the head/slider 59 is called the air outflow end, while the base end side thereof is called the air inflow end. The flexure tongue 123 is supported by the main rings 115*a* and 115*b* near the air inflow end. The head/slider 59 is inclined toward the magnetic head at the air outflow end rather than the air inflow end while the head/slider 59 flies over the magnetic disk and is retracted in a ramp mechanism.

The magnetic disk 13 rotates in a direction from the base end side toward the distal end side with respect to the flexure assembly 100. The viscous air created on the surface of the magnetic disk 13 flows from the air inflow end of the head/slider 59 and sneaks into a space between the air bearing surface and the magnetic disk surface, then exiting from the air outflow end. Thus, the viscous air flow gives the air bearing surface of the head/slider an ascending force. A dimple contact point (DCP) 125 is defined substantially at the center of the back of the flexure tongue 123. A dimple (not shown) formed on the load beam 51 comes in contact with the DCP 125, and the flexure tongue 123 performs a pivotal motion about the pivot of the dimple in the pitching and rolling directions.

Figure 3C:
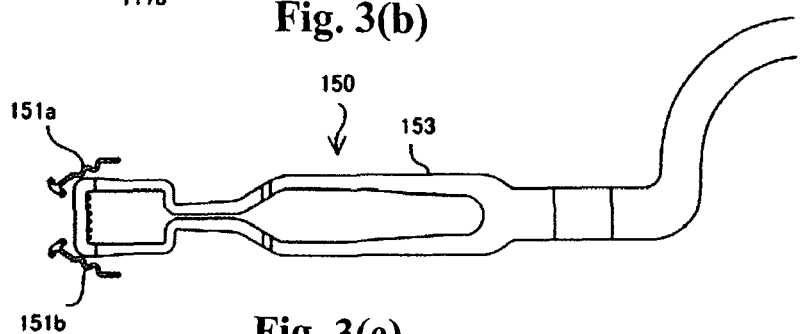
Figure 3D:
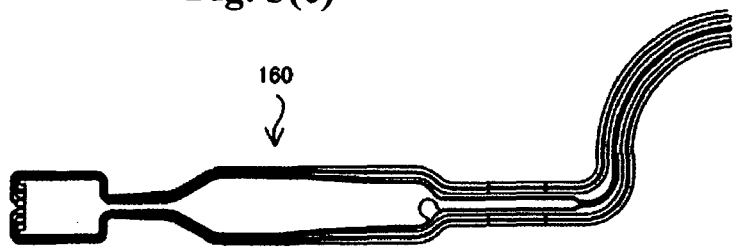

There is formed at the air outflow end of the flexure tongue 123 a platform 131 for positioning a lead pad when the lead pad formed at an end of a wiring layer 160 shown in FIG. 3(D) is soldered to a bonding pad provided on a side face of the air outflow end of the head/slider 59. Overhanging portions 117*a* and 117*b* extend toward the main rings 113*a* and 113*b* from ends of the flexure tongue 123. Moving-side limiter coupling portions 127*a* and 127*b* are defined at the overhanging portions 117*a* and 117*b*, respectively. Further, fixing-side limiter coupling portions 129*a* and 129*b* are defined at the main rings 113*a* and 113*b*, respectively. The fixing-side limiter coupling portions 129*a* and 129*b* are determined to be near the fixing portion 119*b* in the main rings 113*a* and 113*b*.

FIG. 3(C) shows an insulating layer 150 formed of polyimide for insulating the metal layer 110 from the wiring layer 160 (FIG. 3(D)). The insulating layer 150 is composed of a wiring lower layer portion 153 which matches the path of the wiring layer 160 and strip-shaped dielectric limiters 151*a* and 151*b*, each of which is laminated on the metal layer 110. The wiring lower layer portion 153 and the dielectric limiters 151*a* and 151*b* are formed in a laminating process of the insulating layer 150, and the thickness thereof is selected from a range of 0.003 mm to 0.02 mm. The width of the strip-shaped dielectric limiters is selected from a range of 0.01 to 0.1 mm.

The dielectric limiter 151*a* couples the moving-side limiter coupling portion 127*a* to the fixing-side limiter coupling portion 129*a*. The dielectric limiter 151*b* couples the moving-side limiter coupling portion 127*b* to the fixing-side limiter coupling portion 129*b*. The overhanging portions 117*a* and 117*b* serve to dispose the dielectric limiters 151*a* and 151*b* in the space surrounded by the main rings 113*a* and 113*b*, the flexure tongue 123, and the wiring lower layer portion 153 so as not to interfere with the wiring lower layer portion 153 of the insulating layer 150 and the main rings 113*a* and 113*b*. The dielectric limiters 151*a* and 151*b* are formed only in the space among the main rings 113*a*, 115*a*, 113*b*, and 115*b* and the flexure tongue 123.

A predetermined between-coupling-portions distance is ensured between the fixing-side limiter coupling portion 129*a* and the moving-side limiter coupling portion 127*a*. Further, the same between-coupling-portions distance is ensured between the fixing-side limiter coupling portion 129*b* and the moving-side limiter coupling portion 127*b*. The distance between a fixing-side limiter coupling portion and a corresponding moving-side limiter coupling portion always varies while the flexure tongue 123 performs a pivotal motion. In this specification, however, the between-coupling-portions distance refers to a maximum distance between coupling portions during the pivotal motion. The gross length of each of the dielectric limiters 151*a* and 151*b* is sufficiently larger than the between-coupling-portions distance. In this specification, the gross length of a dielectric limiter refers to the length of the limiter between a fixing-side coupling portion and a moving-side coupling portion just before the dielectric limiter begins to exert tension when the dielectric limiter is pulled so that an extra portion extends fully.

The dielectric limiters 151*a* and 151*b* can be provided with a bent portion in the direction of the plane of the insulating layer or can be formed in a winding shape in the direction of the plane of the insulating layer in order to ensure the gross length larger than the between-coupling-portions distance in the limited space formed among the main rings 113*a*, 115*a*, 113*b*, and 115*b* and the flexure tongue 123. If the gross length of the dielectric limiter is too small, the performance of a pivotal motion deteriorates. If the gross length of the dielectric limiter is too large, the limiter function deteriorates. Accordingly, the gross length of the dielectric limiter preferably ranges from 110% to 130% of the between-coupling-portions distance, and most preferably ranges from 115% to 125%, thereby advantageously striking a balance between the limiter function and the performance of a pivotal motion. If a winding shape is formed in a direction perpendicular to the plane of the insulating layer, the dielectric limiter may come in contact with the load beam or the magnetic disk surface, which may undesirably impede a pivotal motion.

Figure 3E:
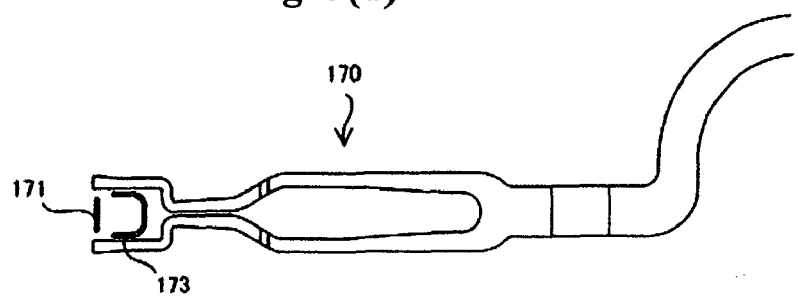

FIG. 3(D) shows the copper wiring layer 160 laminated on the wiring lower layer portion 153. The wiring layer 160 provides a path for electric signals to the head/slider. In this embodiment, the wiring layer 160 is constructed of a total of six copper layers, and a lead pad is formed at each of the distal ends of the copper layers. A read head, a write head, and a heater for thermal control formed at the head/slider 59 are connected to a slider pad formed on a side face of the head/slider, and the lead pad is connected to the slider pad. FIG. 3(E) shows a cover layer laminated on the wiring layer 160. The cover layer 170 is formed of polyimide and provided to protect the surface of the wiring layer 160. The cover layer 170 includes limit areas 171 and 173 laminated on the flexure tongue 123. The limit areas 171 and 173 serves to adjust the attitude of the head/slider when the head/slider 59 is glued on the flexure tongue 123. The dielectric limiters 151a and 151b may be formed of the material of the cover layer in a process for laminating the cover layer 170.

Figure 5A:
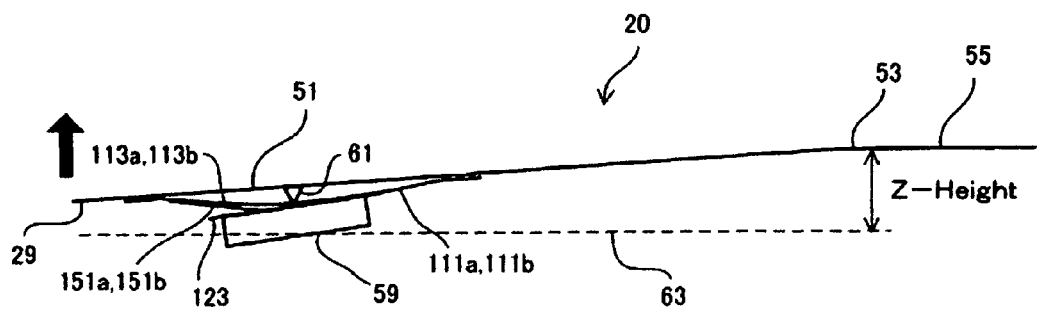
FIGS. 5(A) and 5(B) are schematic side views illustrating the suspension assembly.
Figure 5B:
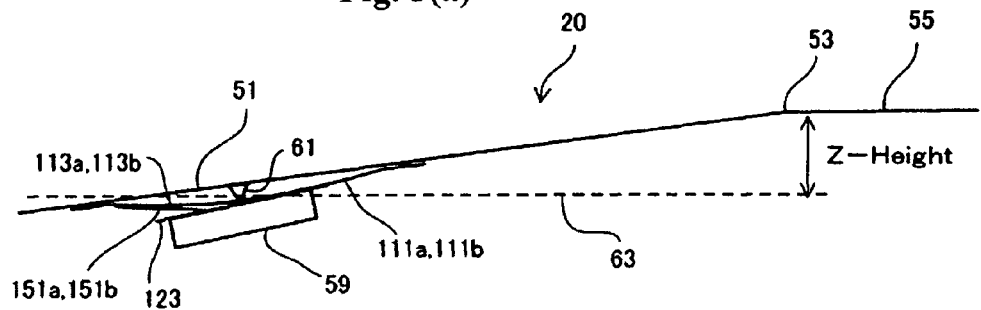

FIG. 5 is a schematic side view showing the mount plate 55 of the HGA 20 mounted to a jig. In FIG. 5, a dimple 61 is in contact with the DCP defined at the load beam side of the flexure tongue 123. A line 63 indicates an imaginary surface corresponding to the magnetic disk surface. Z-Height denotes the height of the mount plate 55 relative to the magnetic disk surface when the HGA 20 is actually incorporated in the magnetic disk drive. Since a pressing load is applied to the load beam 51 by the hinge 53 so that the head/slider 59 moves toward the surface of the magnetic disk, the HGA 20 is inclined toward the magnetic disk at the distal end side from the hinge 53 as shown in FIG. 5(B) in comparison with the case of actually flying over the magnetic disk.

FIG. 5(A) shows a state lifted by applying a force in the direction of an arrow to the lift tab 29 until a point corresponding to the DCP on the air bearing surface of the head/slider 59 intersects the line 63. In this case, the angle which the air bearing surface of the head/slider forms with the line 63 is called a static pitch angle (PSA). PSA is measured in a state where the HGA 20 is not mounted on the base 11 (FIG. 1). The plus sign of PSA is given to the direction that moves the air inflow end of the head/slider 59 away from and the air outflow end toward the surface of the magnetic disk, while the minus sign of PSA is given to the direction that moves the air outflow end away from the surface of the magnetic disk. If the air bearing surface is parallel to the surface of the magnetic disk 13, PSA is zero. Moreover, PSA has manufacturing tolerances. If PSA falls within a plus tolerance limit, the head/slider can perform an appropriate pivotal motion.

In the magnetic disk drive incorporating the HGA 20, when the head/slider 59 follows a track, performing a gimbal motion in a state of flying over the magnetic disk, the dielectric limiters 151a and 153a extend and contract at the wavy portions so as not to affect the pivotal motion. If the distance between the fixing-side limiter coupling portion and the moving-side limiter coupling portion varies during the pivotal motion, the wavy portions of the dielectric limiters 151a and 153a become deformed substantially in the direction of the plane of the insulating layer, so that the dielectric limiters 151a and 153a do not come in contact with the surface of the magnetic disk 13 or the load beam 51 during the pivotal motion.

While the HGA 20 is retracted in the ramp mechanism, the lift tab 29 is placed on a sliding surface and the head/slider 59 is supported by the flexure assembly 100 and suspended from the load beam 51. The magnetic disk drive needs to tolerate a larger external impact force during non-operation than during operation. When an impact is applied to the magnetic disk drive during non-operation so that a strong acceleration toward the surface of the magnetic disk is applied to the HGA 20, by the action of acceleration on the mass of the head/slider 59 a force is applied to the flexure tongue, the main rings, and sub-rings, which therefore become deformed, and the head/slider becomes displaced toward the magnetic disk. Since the flexure assembly 100 has a flexible structure for a pivotal motion, the flexure assembly 100 itself cannot suppress this force. If the displacement of the head/slider beyond a predetermined limit is not suppressed, the flexure assembly is plastic-deformed.

The HGA 20 obtained by mounting the head/slider to the suspension assembly 100 shown in FIG. 4 from which the dielectric limiters 151a and 151b were removed was fixed to a jig, and vertical accelerations were applied to the jig. Under an acceleration of 3000 G, the flexure assembly was observed to be plastic-deformed at an angle of about 0.5 degree in the plus direction with respect to an original PSA. The pitch stiffness of the suspension assembly was 0.7 μNm/deg., the roll stiffness was 0.7 μNm/deg., the peel stiffness was 50 N/m, and the slider was a femto slider.

The pitch stiffness (μNm/deg.) refers to a moment (μNm) encountered when the flexure tongue 123 is tilted about the DCP 125 by a unit angle in a pitching direction. The roll stiffness (μNm/deg.) refers to a moment (μNm) encountered when the flexure tongue 123 is tilted about the DCP 125 by a unit angle in a rolling direction. The peel stiffness (N/m) refers to a force required for displacing the flexure tongue 123 by a unit length in a magnetic disk direction at the position of the DCP 125.

The HGA 20 obtained by mounting the dielectric limiters 151a and 151b to the suspension assembly 100 of the same structure was fixed to the jig, and accelerations were applied to the jig in the same way. The gross length of the dielectric limiters 151a and 151b is selected such that tension acts before the flexure tongue 123 is so displaced by acceleration that the distance between the moving-side limiter coupling portions 127a and 127b and the fixing-side limiter coupling portions 129a and 129b reaches the plastic deformation region of the flexure assembly. In the HGA 20 provided with the dielectric limiters 151a and 151b, when the flexure assembly 100 is displaced until just before plastic deformation, the dielectric limiters 151a and 151b fully extend and begin to exert tension, thus restraining the flexure tongue 123 from being further displaced and preventing the plastic deformation. When accelerations in a direction perpendicular to the jig were applied to the HGA 20 provided with the dielectric limiters 151a and 151b, the flexure assembly was observed not to be plastic-deformed in the pitch and roll directions at accelerations up to 5000 G. Thus, the dielectric limiters 151a and 151b can satisfy the guaranteed performance of resistance to impact force in the state where the HGA 20 is retracted in the ramp mechanism 21.

Since the flexure tongue 123 is supported at the air inflow end side by the main rings 115a and 115b, the displacement of the flexure tongue 123 caused by an acceleration applied to the HGA 20 is largest at the air outflow end side. Therefore, in order to effectively exert the limiter function of the dielectric limiters 151a and 151b, it is preferable that the moving-side limiter coupling portions 127a and 127b be provided as close as possible to the air outflow end side. They are preferably provided at the air outflow end side from the DCP 125. When an acceleration is applied to the flexure assembly 100, the main rings 113a, 113b, 115a, and 115b and the sub-rings 111a and 111b as well as the flexure tongue 123 are displaced. The displacement thereof is largest near the main rings 115a and 115b away from the fixing portions 119a and 119b among the main rings and the sub-rings. Therefore, in order to effectively exert the limiter function, it is preferable that the fixing-side limiter coupling portions 129a and 129b be provided as close as possible to the fixing portion 119b.

The dielectric limiters 151a and 151b according to this embodiment do not require machine work and can be formed only by making a small modification to an insulating layer pattern in a manufacturing process of a conventional suspension assembly. Therefore, these are suitable for making the magnetic disk drive smaller and enable cost reduction. Further, the exertion of the limiter function does not reduce the performance of a pivotal motion.

Figure 6:
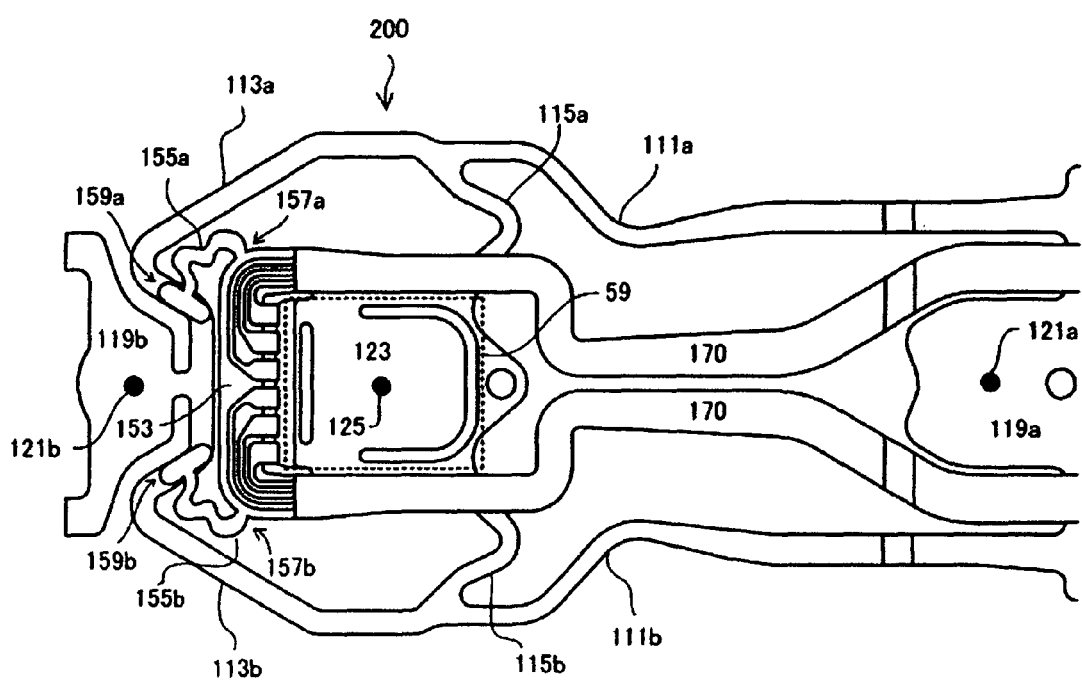
FIG. 6 is an illustration of a flexure assembly according to another embodiment.

FIG. 6 is a partial enlarged view showing the plane structure of a flexure assembly 200 according to another embodiment of the invention. The flexure assembly 200 differs from the flexure assembly 100 shown in FIG. 4 only in that the overhanging portions 117a and 117b do not exit and moving-side limiter coupling portions 157a and 157b of dielectric limiters 155a and 155b exit in the wiring lower layer portion 153 of the insulating layer. That is, the dielectric limiters 155a and 155b as well as the wiring lower layer portion 153 are formed of polyimide in such a manner so as to couple the moving-side limiter coupling portions 157a and 157b to fixing-side limiter coupling portions 159a and 159b respectively in the laminating process of the insulating layer 150 shown in FIG. 3(C). Accordingly, the flexure assembly 200 does not require the overhanging portions 117a and 117b which the flexure assembly 100 requires. Further, since the moving-side limiter coupling portions 157a and 157b can be provided at the air outflow end side so as to effectively suppress the displacement of the flexure tongue 123, the dielectric limiters 155a and 155b can exert the limiter function in the most effective manner possible.

However, since the distance between the fixing-side limiter coupling portion and the moving-side limiter coupling portion is short, there is required a space for ensuring the gross length of the dielectric limiter necessary for a free pivotal motion. In the flexure assemblies 100 and 200, the fixing-side limiter coupling portions 129a, 129b, 159a, and 159b are provided at the main rings 113a and 113b. Since the fixing-side limiter coupling portions 129a, 129b, 159a, and 159b are displaced by a small amount when an acceleration is applied to the flexure assemblies 100 and 200 and are preferably provided at positions of a predetermined strength, the fixing-side limiter coupling portions 129a, 129b, 159a, and 159b may be provided at the fixing portion 119b. In the flexure assemblies 100 and 200, the air outflow end is disposed at a distal end side. However, in the case where the magnetic disk 13 rotates reversely, the air outflow end is disposed at a base end side. In this case, the fixing-side limiter coupling portions are provided at the fixing portion on the base end side.

In this embodiment, the distal end portion of the flexure assembly is spot-welded to the load beam 59 at the two weld spots 121a and 121b. However, the dielectric limiter according to embodiments of the invention is also applicable to a flexure assembly where spot welding is performed only at one point.

It will be understood that the foregoing description has been made on the specific embodiments of the invention shown on the accompanying drawings and that the invention is not limited thereto, but may be otherwise variously embodied in any known arrangements as long as the effects of the invention are produced.

What is claimed is:

1. A suspension assembly for use in a magnetic disk drive, including a load beam and a flexure assembly, the flexure assembly comprising:
    a metal layer where there are formed a fixing portion fixed to the load beam, an arm portion extending from the fixing portion, and a flexure tongue having a moving-side limiter coupling portion defined thereon and supported by the arm portion, wherein the arm portion includes a first arm portion and a second arm portion formed symmetrically with respect to a longitudinal axis of the load beam, a first fixing-side limiter coupling portion is defined at the first arm portion, a second fixing-side limiter coupling portion is defined at the second arm portion, a first moving-side limiter coupling portion and a second moving-side limiter coupling portion are defined at the flexure tongue;
    an insulating layer including a wiring lower layer portion and laminated on the metal layer; and
    a dielectric limiter having a gross length larger than a between-coupling-portions distance between a fixing-side limiter coupling portion defined at a portion other than the flexure tongue of the flexure assembly and the moving-side limiter coupling portion and coupling the fixing-side limiter coupling portion to the moving-side limiter coupling portion, and the dielectric limiter is composed of a first dielectric limiter coupling the first fixing-side limiter coupling portion to the first moving-side limiter coupling portion and a second dielectric limiter coupling the second fixing-side limiter coupling portion to the second moving-side limiter coupling portion.

2. The suspension assembly according to claim 1, wherein the gross length of the dielectric limiter is selected such that tension does not act while the flexure tongue performs a pivotal motion and tension acts before the flexure tongue is displaced to a plastic deformation region.

3. The suspension assembly according to claim 1, wherein the gross length of the dielectric limiter ranges from 110% to 130% of the between-coupling-portions distance.

4. The suspension assembly according to claim 1, wherein the insulating layer is formed of polyimide and the dielectric limiter is formed of polyimide in a same process as that for the wiring lower layer portion.

5. The suspension assembly according to claim 4, wherein a width of the dielectric limiter is selected from a range of 0.01 mm to 0.1 mm and a thickness of the dielectric limiter is selected from a range of 0.003 mm to 0.02 mm.

6. The suspension assembly according to claim 1, wherein the dielectric limiter is formed in a strip shape and is winding in a direction of a plane of the insulating layer.

7. The suspension assembly according to claim 1, wherein the fixing-side limiter coupling portion is defined at the fixing portion of the metal layer.

8. The suspension assembly according to claim 1, wherein the fixing-side limiter coupling portion is defined near the fixing portion of the arm portion.

9. The suspension assembly according to claim 1, wherein the fixing portion includes a first fixing portion formed at a distal end side of the load beam and a second fixing portion formed at a base end side, and the fixing-side limiter coupling portion is defined at the first fixing portion.

10. The suspension assembly according to claim 1, wherein a dimple point is defined in the flexure tongue, and the moving-side limiter coupling portion is defined at an air outflow end side from the dimple point.

11. The suspension assembly according to claim 1, wherein the flexure tongue is provided with a first overhanging portion and a second overhanging portion formed symmetrically with respect to the longitudinal axis of the load beam, and the first moving-side limiter coupling portion and the second moving-side limiter coupling portion are defined at the first overhanging portion and the second overhanging portion, respectively.

12. The suspension assembly according to claim 1, wherein the first dielectric limiter is disposed in a space between the first arm portion and the flexure tongue, and the second dielectric limiter is disposed in a space between the second arm portion and the flexure tongue.

13. The suspension assembly according to claim 1, wherein the dielectric limiter is disposed only in a space between the arm portion and the flexure tongue.

14. The suspension assembly according to claim 1, further comprising a wiring layer laminated on the wiring lower layer portion and a cover layer laminated on the wiring layer, wherein the dielectric limiter is formed of a same material as that of a cover layer in a laminating process of the cover layer.

15. A suspension assembly for use in a magnetic disk drive, including a load beam and a flexure assembly, the flexure assembly comprising:
   a metal layer where there are formed a fixing portion fixed to the load beam, an arm portion extending from the fixing portion, and a flexure tongue supported by the arm portion;
   an insulating layer which includes a wiring lower layer portion having a moving-side limiter coupling portion defined thereon and is laminated on the metal layer, wherein the arm portion includes a first arm portion and a second arm portion formed symmetrically with respect to a longitudinal axis of the load beam, a first fixing-side limiter coupling portion is defined at the first arm portion, a second fixing-side limiter coupling portion is defined at the second arm portion, a first moving-side limiter coupling portion and a second moving-side limiter coupling portion are defined at the flexure tongue; and
   a dielectric limiter having a gross length larger than a between-coupling-portions distance between a fixing-side limiter coupling portion defined at a portion other than the flexure tongue of the flexure assembly and the moving-side limiter coupling portion and coupling the fixing-side limiter coupling portion to the moving-side limiter coupling portion, and the dielectric limiter is composed of a first dielectric limiter coupling the first fixing-side limiter coupling portion to the first moving-side limiter coupling portion and a second dielectric limiter coupling the second fixing-side limiter coupling portion to the second moving-side limiter coupling portion.

16. The suspension assembly according to claim 15, wherein the dielectric limiter is formed of a same material as that of the insulating layer in a same process as that for the insulating layer.

17. The suspension assembly according to claim 15, wherein the fixing-side limiter coupling portion is defined at a distal end side of the flexure assembly, and the moving-side limiter coupling portion is defined at an air outflow end side of the wiring lower layer portion.

18. A magnetic disk drive comprising:
   a magnetic disk; and
   a suspension assembly moving rotationally with respect to the magnetic disk, the suspension assembly comprising:
      a metal layer where there are formed a fixing portion fixed to a load beam, an arm portion extending from the fixing portion, and a flexure tongue having a moving-side limiter coupling portion defined thereon and supported by the arm portion, wherein the arm portion includes a first arm portion and a second arm portion formed symmetrically with respect to a longitudinal axis of the load beam, a first fixing-side limiter coupling portion is defined at the first arm portion, a second fixing-side limiter coupling portion is defined at the second arm portion, a first moving-side limiter coupling portion and a second moving-side limiter coupling portion are defined at the flexure tongue;
      an insulating layer including a wiring lower layer portion and laminated on the metal layer; and
      a dielectric limiter having a gross length larger than a between-coupling-portions distance between a fixing-side limiter coupling portion defined at a portion other than the flexure tongue of a flexure assembly and the moving-side limiter coupling portion and coupling the fixing-side limiter coupling portion to the moving-side limiter coupling portion, and the dielectric limiter is composed of a first dielectric limiter coupling the first fixing-side limiter coupling portion to the first moving-side limiter coupling portion and a second dielectric limiter coupling the second fixing-side limiter coupling portion to the second moving-side limiter coupling portion; and
   a head/slider mounted to the suspension assembly.

19. The magnetic disk drive according to claim 18, further comprising a ramp mechanism.

* * * * *